Patented June 29, 1937

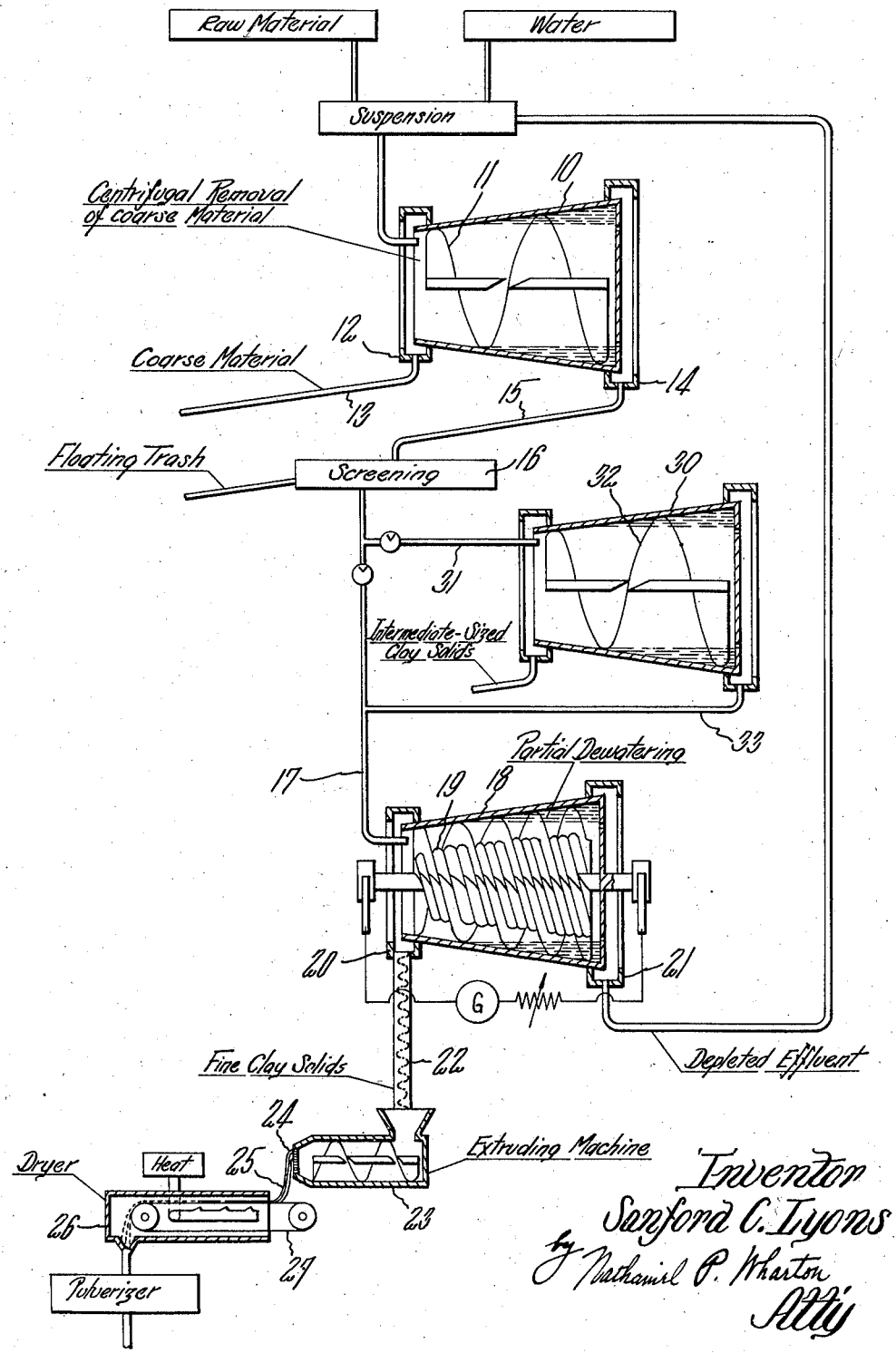

2,085,537

UNITED STATES PATENT OFFICE 2,085,537

CONDITIONING OF FRESHLY QUARRIED CLAY

Sanford C. Lyons, Bennington, Vt., assignor to Bird Machine Co., Walpole, Mass., a corporation of Massachusetts Application January 18, 1935, Serial No. 2,369

13 Claims. (Cl. 233—18)

This invention relates to the conditioning of freshly quarried clays, such as the kaolins and china clays, to produce purified marketable products.

In conditioning clay for the market, the practice usually employed devolves about slow operations carried out largely on a batch scale in expensive equipment that is spread over much space and requires considerable labor. Thus, according to the practice generally in vogue, the freshly quarried clay is mixed with water to form a very dilute suspension, usually of about 1% or so solids content, from which coarse impurities are settled out in a sluicing system so extensive as to necessitate out-door installation with the climatic and other inconveniences incident thereto. The suspension is then concentrated in large tanks preparatory to being delivered to filter presses, which dewater the clay to the plastic consistency desired for drying. The cakes of clay as recovered from the filter presses do not lend themselves to convenient or economical handling and/or drying. This can be seen from the fact that after a press has taken on its capacity or load of filtered clay, an operator must remove the cakes therefrom and there is a long period when filter-pressed clay is unavailable for drying from a particular press. In other words, the element of manual labor coupled with the idle period incident to the operation of a filter press make for incompatibility with a continuously running dryer.

In accordance with the present invention, freshly quarried clay is suspended in water to produce a readily flowable suspension but one of comparatively high solids content, namely, a solids content of at least about 15%. The suspension is then delivered as a progressively flowing stream through a continuous flow centrifuge which is operated under such conditions as to rid it progressively and practically completely of coarse impurities and then through a continuous flow electrophoretic centrifuge which combines electrophoretic and centrifugal actions to separate progressively from the stream its fine solids content and to deliver such solids content as a progressively moving plastic clay mass of at least about 50% solids content that can be readily and progressively dried to completion. Such plastic clay mass is preferably extruded progressively into elongated bodies of small and substantially uniform cross-sectional area that lend themselves to progressive drying to substantial completion rapidly and substantially uniformly. It is thus seen that the practice of the present invention may afford substantial continuity of operation, beginning with a suspension of freshly quarried clay and ending with a purified and dried product ready for the market. Such practice is advantageous in that it can be performed with compact apparatus having comparatively high capacity and yielding a given amount of finished clay product of controllable and reproducible quality at lower cost than a clay product produced as heretofore.

On the accompanying drawing, I have illustrated diagrammatically and conventionally apparatus such as I employ in practicing the process of the present invention.

As illustrated on the drawing, freshly quarried clay is first admixed with water to form a substantially homogeneous and fluid suspension of moderately high solids content, preferably a suspension of about 20% to 35% solids content. In some instances, it may be desirable to add to the water used as the suspension vehicle a small amount of a dispersing agent, such as sodium silicate, for the purpose of deflocculating such aggregates of intrinsically fine clay particles as may exist in the particular clay constituting the raw material or as may tend to develop in an aqueous suspension prepared from the clay. The suspension containing, if desired, a suitable dispersing or deflocculating agent is delivered to a continuous-flow centrifuge 10, for instance, of the type illustrated and described in detail in my patent application Serial No. 756,954, filed December 11, 1934. Such centrifuge includes, as shown, a frustro-conical shell and a propelling screw 11 which functions to discharge solids depositing on the internal wall of the shell through the small diameter end of the shell as suspension is being emitted through its large diameter end. The suspension is fed into the centrifuge preferably adjacent to its small diameter end, thereby causing the suspension to traverse substantially the full length of the centrifuge and thus be acted upon by centrifugal force for the maximum period of time commensurate with the particular volumetric flow of suspension being maintained through the centrifuge. The conditions of operation of the centrifuge, including its effective diameter, its rate of rotation, and the rate of flow of suspension therethrough, are such as to conduce essentially only to the deposition of coarse or oversized solids, such as sand, quartz, mica, and other grit, on the internal wall of the centrifuge. Such coarse solids or impurities are received from the small diameter end of the centrifuge in an annular trough 12 and are discharged through a pipe 13. The substantially grit-free suspension is received from the large diameter end of the centrifuge in an annular trough 14 and may, if desired, be delivered therefrom through a pipe 15 through a rotary or other suitable screen 16 which serves to eliminate from the suspension such fibrous material as bark, wood, or other floating trash.

The purified or refined clay suspension may then be delivered by a pipe 17 to a continuous-flow electrophoretic centrifuge 18 more particularly of the type illustrated and described in detail in my patent application Serial No. 744,759, filed September 20, 1934, now Patent No. 2,057,156, dated October 13, 1936. Such a centrifuge 18 includes, as shown, a frustro-conical shell and a propelling screw 19 which functions to discharge solids depositing on the electrically charged internal wall of the shell through the small diameter end of the shell while liquid is flowing out through its large diameter end, thereby avoiding substantial impairment of the electro-attractive force exercised by the wall and hence ensuring a progressive separation of solids at substantially uniform effectiveness from the suspension, as pointed out in my last-named application. The centrifuge 18 is subject to an electrophoretic circuit, its shell being impressed with a positive electrical charge and being electro-insulated from its propelling screw 19, which is impressed with the electro-negative charge. By ensuring the proper conditions of operation of the centrifuge 18, including the impression thereupon of adequate voltage, it is possible, as pointed out in my last-named application, to realize the deposition of a comparatively thick paste or plastic mass of a solids content of as high as about 60% to 70% on the internal wall of the centrifuge and so to deplete the suspension of clay solids that the aqueous effluent from the centrifuge is of comparatively very low solids content. The plastic clay mass being progressively discharged from the small diameter end of the centrifuge may be received in an annular trough 20 at a solids content preferably of about 60% to 70% for further treatment presently to be described. The aqueous effluent being progressively emitted from the large diameter end of the centrifuge may be recovered in an annular trough 21 and, as shown, be used as the aqueous medium for the preparation of other raw aqueous clay suspension, thereby conserving such residual clay as may be present in the effluent.

The plastic clay mass may be progressively taken from the trough 20 through a positive-feed sluice or conduit 22 to an extruding machine 23, which discharges such mass through a multiplicity of apertures 24 as elongated bodies 25 of small, substantially uniform cross-sectional area. These bodies may be dried in any suitable way but, as shown, they are preferably transferred directly from the extruding machine to a continuous dryer 26, comprising an endless carrier or conveyor 27, on which latter the bodies are received and on which their drying is progressively effected by currents of hot air suitably brought to play thereupon. More specifically, I prefer to accomplish the extrusion and drying of the clay in the manner disclosed in my patent application Serial No. 755,191, filed November 28, 1934, now Patent No. 2,032,624, dated March 3, 1936, according to which application, provision is made to keep the extruding machine from being fouled by the clay mass as well as to dry the extruded bodies progressively as they are being delivered by the extruding machine. The dried clay bodies may be shipped as such to the consumer, although, in some cases, it is preferable to deliver them directly from the dryer into a suitable crushing or pulverizing machine, for instance, into a hammermill, which reduces them to a pulverulent condition.

If desired, other steps may be introduced into or form part of the process of the present invention hereinbefore described. Thus, before the aqueous suspension of raw clay is introduced into the centrifuge 18, it may be permitted to remain quiescent for a short period of time in a settling tank wherein the very coarsest of impurities, such as tend to subside promptly from the suspension, are permitted to settle. The supernatent suspension containing the more difficultly removable impurities, including those that can be removed only after a long period of settling, may then be delivered to the centrifuge 18. When the suspension contains coloring impurities, particularly ferric oxide or other coloring ferruginous compounds, it may be treated with a suitable decolorizing chemical, such as sulphurous acid, sodium bisulphite, hyposulphurous acid, sodium hyposulphite, or the like, which serves to transform such coloring compounds to colorless, water-soluble condition.

In practice, the chemical decolorizing treatment of the clay suspension is preferably followed by one or more other treatments for preventing the decolorized, dissolved impurities from resuming their original coloration of the clay by reason of oxidation, action of light thereupon, etc. The treatment for inhibiting the recurrence of undesirable coloration of the clay may, for example, include one or more rinsings of the clay suspension with water and the decantation of the rinsing water carrying the dissolved impurities from the suspension; or the treatment may involve the precipitation of the dissolved decolorized impurities as insoluble substantially colorless solids substantially stable toward atmospheric influences. The treatment of the clay suspension with the decolorizing chemical may be performed either before or after coarse impurities have been centrifugally removed from the suspension. By virtue of the high concentration of solids in the suspension, a comparatively small amount of decolorizing chemical is all that is necessary to create in the suspension ample concentration of such chemical for accomplishing the desired reaction on the coloring compounds.

There are some clays which contain a substantial fraction of useful intermediate-sized clay solids as well as extremely fine or colloidal clay solids. As already indicated, the action of the centrifuge 10 on the stream of freshly quarried clay suspension is to remove therefrom substantially only oversized impurities, that is, such gritty impurities as sand, quartz, mica, etc. In other words, extremely little, if any, clay solids are lost through the centrifugal purification effected in the centrifuge 10. However, after the clay suspension has undergone the action of the centrifuge 10, it may, in some instances, be advantageously subjected to a more intensive centrifugating action in a second centrifuge constructed essentially like the centrifuge 10 but operated under a set of conditions designed to remove progressively from the continuously flowing suspension the intermediate-sized clay solids, leaving in the effluent suspension substantially only the fine or colloidal clay solids that can be separated from the suspension to good advantage by the combined electrophoretic and centrifugal actions of the centrifuge 18, as hereinbefore described. Such an intermediate centrifuge 30 is shown in the drawing as being capable of receiving from a feed pipe 31 entering through its small diameter end the clay suspension previously rid of coarse or oversized solids in the centrifuge 10. The intermediate-sized clay solids fraction deposited on the wall of the centrifuge 30 may be discharged by a propelling screw 32 through the small diameter end of such centrifuge and the liquid effluent containing the fine and colloidal clay in suspension therein may be emitted through the large diameter end of such centrifuge and delivered by a pipe 33 to the pipe 17 feeding into the continuous-flow electrophoretic centrifuge 18 wherein the deposition of the fine and colloidal clay solids takes place. The intermediate-sized clay solids are recovered as a plastic mass which may be substantially completely dried or otherwise treated in much the same way as is the recovered fine and colloidal clay solids.

I claim:—

1. In the conditioning of freshly quarried clay to produce a purified and marketable product, the practice which comprises suspending the clay in water to produce a readily flowable suspension, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, and drying such removed plastic mass.

2. In the conditioning of freshly quarried clay to produce a purified and marketable product, the practice which comprises suspending the clay in water to produce a readily flowable suspension, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, progressively extruding such plastic mass into elongated bodies of small cross-sectional area, and drying such bodies substantially uniformly to completion.

3. In the conditioning of freshly quarried clay to produce a purified and marketable product, the practice which comprises suspending the clay in water to produce a readily flowable suspension of a solids content of at least about 15%, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass of at least about 50% solids content while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, and drying such removed plastic mass.

4. In the conditioning of freshly quarried clay to produce a purified and marketable product, the practice which comprises suspending the clay in water to produce a readily flowable suspension of a solids content of at least about 15%, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass of at least about 50% solids content while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, progressively extruding such plastic mass into elongated bodies of small cross-sectional area, and progressively drying such bodies substantially uniformly to completion.

5. In the conditioning of freshly quarried clay to produce a purified and marketable product, those steps which comprise progressively streaming an aqueous suspension of such clay through a centrifuge to deposit progressively under centrifugal force on its wall oversized impurities and then progressively streaming the suspension through another centrifuge, whose wall is electrically charged to attract the fine solids content of said suspension, to deposit progressively on its wall under combined electrophoretic and centrifugal forces said fine solids content as a plastic mass while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass.

6. In the conditioning of freshly quarried clay to produce a purified and marketable product, those steps which comprise suspending the clay in water to produce a flowable suspension of at least about 15% solids content and progressively streaming the suspension through a centrifuge to deposit progressively under centrifugal force on its wall oversized impurities and then progressively streaming the suspension through another centrifuge, whose wall is electrically charged to attract the fine solids content of said suspension, to deposit progressively on its wall under combined electrophoretic and centrifugal forces said fine solids content as a plastic mass of at least about 50% solids content while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass.

7. In the conditioning of freshly quarried clay to produce a purified and marketable product, those steps which comprise suspending the clay in water to produce a readily flowable suspension, progressively streaming the suspension through a centrifuge to deposit progressively under centrifugal force on its wall oversized impurities, then progressively streaming the suspension through another centrifuge to deposit progressively on its wall under more intensive centrifugal force intermediate-sized clay solids as a plastic mass while substantially constantly removing said plastic mass from said wall to maintain substantially constant the centrifugal force acting to deposit said intermediate-sized clay solids and thereby substantially constantly to maintain of substantially uniform average particle size said clay solids being deposited and removed as a plastic mass, and then progressively streaming the suspension through still another centrifuge, whose wall is electrically charged to attract the fine and colloidal clay solids content of said suspension, to deposit progressively on its wall under combined electrophoretic and centrifugal forces said fine and colloidal solids content as a plastic mass while substantially constantly removing said plastic mass from said wall to maintain substantially constant the combined electrophoretic and centrifugal forces acting to deposit said fine and colloidal solids and thereby substantially constantly to maintain of substantially uniform average particle size said fine and colloidal solids being deposited and removed as a plastic mass.

8. In the conditioning of freshly quarried clay to produce a purified and marketable product, that practice which comprises suspending the clay in water in the presence of a dispersing agent to produce a readily flowable suspension of at least about 15% solids content, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, and drying such removed plastic mass.

9. In the conditioning of freshly quarried clay to produce a purified and marketable product, the practice which comprises suspending the clay in an aqueous vehicle to produce a readily flowable suspension, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass while causing aqueous effluent to be emitted from said second-named centrifuge and while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, and reusing aqueous effluent emitted from said second-named centrifuge as aqueous vehicle for suspending freshly quarried clay in performing the first-named step of said practice.

10. In the conditioning of freshly quarried clay to produce a purified and marketable product, the practice which comprises suspending the clay in an aqueous vehicle in the presence of a dispersing agent to produce a readily flowable suspension of at least about 15% solids content, progressively streaming the suspension through a centrifuge to deposit progressively under centrifugal force on its wall oversized impurities, then progressively streaming the suspension through another centrifuge, whose wall is electrically charged to attract the fine solids content of said suspension, to deposit progressively on its wall under combined electrophoretic and centrifugal forces said fine solids content as a plastic mass while causing aqueous effluent to be emitted from said second-named centrifuge and while substantially constantly removing said plastic mass from said wall to maintain substantially constant the combined electrophoretic and centrifugal forces acting to deposit said fine solids and thereby substantially constantly to maintain of substantially uniform average particle size said fine solids being deposited and removed as a plastic mass, and reusing aqueous effluent emitted from said second-named centrifuge as aqueous vehicle for suspending freshly quarried clay in performing the first-named step of said practice.

11. In the conditioning of freshly quarried clay to produce a purified and marketable product, those steps which comprise suspending the clay in water in the presence of a dispersing agent to produce a readily flowable suspension of at least about 15% solids content, progressively streaming the suspension through a centrifuge to deposit progressively under centrifugal force on its wall oversized impurities, then progressively streaming the suspension through another centrifuge to deposit progressively on its wall under more intensive centrifugal force intermediate-sized clay solids as a plastic mass while substantially constantly removing said plastic mass from said wall to maintain substantially constant the centrifugal force acting to deposit said intermediate-sized clay solids and thereby substantially constantly to maintain of substantially uniform average particle size said clay solids being deposited and removed as a plastic mass, and then progressively streaming the suspension through still another centrifuge, whose wall is electrically charged to attract the fine and colloidal clay solids content of said suspension, to deposit progressively on its wall under combined electrophoretic and centrifugal forces said fine and colloidal solids content as a plastic mass while substantially constantly removing said plastic mass from said wall to maintain substantially constant the combined electrophoretic and centrifugal forces acting to deposit said fine and collodial solids and thereby substantially constantly to maintain of substantially uniform average particle size said fine and colloidal solids being deposited and removed as a plastic mass.

12. In the conditioning of freshly quarried clay to produce a purified and marketable product, those steps which comprise suspending the clay in an aqueous vehicle to produce a readily flowable suspension, progressively streaming the suspension through a centrifuge to deposit progressively under centrifugal force on its wall oversized impurities, then progressively streaming the suspension through another centrifuge to deposit progressively on its wall under more intensive centrifugal force intermediate-sized clay solids as a plastic mass while substantially constantly removing said plastic mass from said wall to maintain substantially constant the centrifugal force acting to deposit said intermediate-sized clay solids and thereby substantially constantly to maintain of substantially uniform average particle size said clay solids being deposited and removed as a plastic mass, then progressively streaming the suspension through still another centrifuge, whose wall is electrically charged to attract the fine and colloidal clay solids content of said suspension, to deposit progressively on its wall under combined electrophoretic and centrifugal forces said fine and colloidal solids content as a plastic mass while causing aqueous effluent to be emitted from said last-named centrifuge and while substantially constantly removing said plastic mass from said wall to maintain substantially constant the combined electrophoretic and centrifugal forces acting to deposit said fine and colloidal solids and thereby substantially constantly to maintain of substantially uniform average particle size said fine and colloidal solids being deposited and removed as a plastic mass, and reusing aqueous effluent emitted from said last-named centrifuge as aqueous vehicle for suspending freshly quarried clay in performing the first-named step.

13. In the conditioning of freshly quarried clay to produce a purified and marketable product, those steps which comprise suspending the clay in an aqueous vehicle in the presence of a dispersing agent to produce a readily flowable suspension of at least about 15% solids content, progressively streaming the suspension through a centrifuge to deposit progressively under centrifugal force on its wall oversized impurities, then progressively streaming the suspension through another centrifuge to deposit progressively on its wall under more intensive centrifugal force intermediate-sized clay solids as a plastic mass while substantially constantly removing said plastic mass from said wall to maintain substantially constant the centrifugal force acting to deposit said intermediate-sized clay solids and thereby substantially constantly to maintain of substantially uniform average particle size said clay solids being deposited and removed as a plastic mass, then progressively streaming the suspension through still another centrifuge, whose wall is electrically charged to attract the fine and colloidal clay solids content of said suspension, to deposit progressively on its wall under combined electrophoretic and centrifugal forces said fine and colloidal solids content as a plastic mass while causing aqueous effluent to be emitted from said last-named centrifuge and while substantially constantly removing said plastic mass from said wall to maintain substantially constant the combined electrophoretic and centrifugal forces acting to deposit said fine and colloidal solids and thereby substantially constantly to maintain of substantially uniform average particle size said fine and colloidal solids being deposited and removed as a plastic mass, and reusing aqueous effluent emitted from said last-named centrifuge as aqueous vehicle for suspending freshly quarried clay in performing the first-named step.

SANFORD C. LYONS.